United States Patent
Reus et al.

(10) Patent No.: US 9,531,588 B2
(45) Date of Patent: Dec. 27, 2016

(54) DISCOVERY AND MINING OF PERFORMANCE INFORMATION OF A DEVICE FOR ANTICIPATORILY SENDING UPDATES TO THE DEVICE

(75) Inventors: Edward Reus, Woodinville, WA (US); Mario Goertzel, Bellevue, WA (US); Scott Field, Redmond, WA (US); Michael Joseph Healy, Duvall, WA (US); Joseph Dadzie, Redmond, WA (US); David Kays, Redmond, WA (US); John Douceur, Bellevue, WA (US); Henricus Johannes Maria Meijer, Mercer Island, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 21 days.

(21) Appl. No.: 13/329,121

(22) Filed: Dec. 16, 2011

(65) Prior Publication Data
US 2013/0159500 A1   Jun. 20, 2013

(51) Int. Cl.
*G06F 15/173* (2006.01)
*H04L 12/24* (2006.01)
(Continued)

(52) U.S. Cl.
CPC ........... *H04L 41/0813* (2013.01); *H04L 67/20* (2013.01); *H04L 67/303* (2013.01); *H04L 67/306* (2013.01);
(Continued)

(58) Field of Classification Search
USPC ...................................................... 709/224
See application file for complete search history.

(56) References Cited

U.S. PATENT DOCUMENTS 7,092,941 B1   8/2006 Campos
7,457,872 B2 * 11/2008 Aton .................. G06F 11/3476
                                                 709/224
(Continued)

FOREIGN PATENT DOCUMENTS

CN          101222371 A       7/2008

OTHER PUBLICATIONS

Hassan, "The Road Ahead for Mining Software Repositories"—Published Date: Sep. 28, 2008, Proceedings: Frontiers of Software Maintenance, 2008. FoSM 2008, pp. 48-57.
(Continued)

*Primary Examiner* — Aaron Strange
*Assistant Examiner* — James Edwards
(74) *Attorney, Agent, or Firm* — Kate Drakos; Micky Minhas

(57) ABSTRACT

The subject disclosure relates to techniques for monitoring contextual and performance information of a device for anticipatorily sending update information to the device. An interface component can receive, from the client, contextual information indicating an operating environment of the client and performance information that is associated with one or more operations being performed by the client based on the operating environment, and send, based on correlation information, update information to the client. Further, a service component can to infer a relationship between the contextual information and the performance information to obtain the correlation information. In other embodiments, a client can populate a cache with portion(s) of the contextual information to obtain cached information, and send at least a portion of the cached information to a system including one or more aspects of the service component.

21 Claims, 11 Drawing Sheets

(51) Int. Cl.
*H04L 29/08* (2006.01)
*G06F 15/17* (2006.01)
*H04L 12/26* (2006.01)

(52) U.S. Cl.
CPC ............... *H04L 67/34* (2013.01); *G06F 15/17* (2013.01); *H04L 43/08* (2013.01)

(56) References Cited

U.S. PATENT DOCUMENTS

| | | | |
|---|---|---|---|
| 7,509,337 B2 | 3/2009 | Chitgupakar | |
| 7,827,122 B1 | 11/2010 | Campbell, Jr. | |
| 7,921,068 B2 | 4/2011 | Guyon | |
| 2002/0152305 A1* | 10/2002 | Jackson | H04L 12/26 709/224 |
| 2002/0198991 A1 | 12/2002 | Gopalakrishnan et al. | |
| 2003/0041130 A1* | 2/2003 | Harrisville-Wolff | H04L 29/06 709/221 |
| 2003/0191733 A1 | 10/2003 | Kiick | |
| 2005/0027659 A1 | 2/2005 | Kumar et al. | |
| 2005/0216600 A1 | 9/2005 | Maron | |
| 2006/0020937 A1* | 1/2006 | Schaefer | G06F 9/44505 717/175 |
| 2006/0041936 A1* | 2/2006 | Anderson | H04L 63/02 726/11 |
| 2006/0156086 A1* | 7/2006 | Flynn | H04L 12/66 714/712 |
| 2006/0259809 A1* | 11/2006 | Mishra | G06F 21/552 714/4.4 |
| 2007/0143851 A1 | 6/2007 | Nicodemus et al. | |
| 2007/0168498 A1* | 7/2007 | Lambert | H04L 67/38 709/224 |
| 2007/0294387 A1* | 12/2007 | Martin | H04L 29/06 709/224 |
| 2008/0172348 A1 | 7/2008 | Tien | |
| 2009/0161554 A1* | 6/2009 | Agarwal | H04L 41/0631 370/241 |
| 2009/0222399 A1* | 9/2009 | Gomez | G05B 23/0221 706/52 |
| 2009/0276539 A1 | 11/2009 | Huerta et al. | |
| 2010/0070965 A1* | 3/2010 | Britten | G06F 8/65 717/173 |
| 2010/0095021 A1* | 4/2010 | Samuels | H04L 12/5695 709/235 |
| 2010/0192196 A1* | 7/2010 | Lee | G06F 21/55 726/1 |
| 2010/0223341 A1 | 9/2010 | Manolescu et al. | |
| 2011/0145640 A1* | 6/2011 | Hooks | G06F 11/0748 714/26 |
| 2011/0225142 A1* | 9/2011 | McDonald | G06F 21/552 707/710 |
| 2011/0307600 A1* | 12/2011 | Polley | H04L 41/0893 709/224 |
| 2012/0005480 A1* | 1/2012 | Batke | G06F 21/572 713/175 |
| 2013/0111497 A1* | 5/2013 | Chen | G06F 11/0709 718/107 |

OTHER PUBLICATIONS

Rao, "Multi agent-based distributed data mining: An over view"—Published Date: Sep. 28, 2008, Proceedings: International Journal of Reviews in Computing, 2009-2010 IJRIC & LLS, pp. 83-92.
"International Search Report", Mailed Date: Mar. 29, 2013, Application No. PCT/US2012/068324, Filed Date: Dec. 7, 2012, pp. 9.
"First Office Action and Search Report Received for Chinese Patent Application No. 201210546704.X", Mailed Date: Mar. 25, 2015, 12 Pages.
"Supplementary Search Report Received for European Patent Application 12856837.5", Mailed Date: Jul. 3, 2015, 5 Pages.
"Second Office Action Issued in Chinese Patent Application No. 201210546704.X", Mailed Date: Nov. 23, 2015, 6 Pages.

\* cited by examiner

700

Store, by a computing device, contextual information indicating portion(s) of an operating environment that is associated with at least a portion of operation(s) performed by the computing device.

↓

710

Send the contextual information and performance information that is associated with an operation of the operation(s) to a service component.

↓

720

Receive, based on the contextual information and the performance information, configuration information from the service component for configuring the computing device.

↓

730

Configure software and/or hardware of the computing device based on the configuration information.

FIG. 7

DISCOVERY AND MINING OF PERFORMANCE INFORMATION OF A DEVICE FOR ANTICIPATORILY SENDING UPDATES TO THE DEVICE

TECHNICAL FIELD

The subject disclosure generally relates to discovery and mining of performance information of a device for anticipatorily sending updates to the device.

BACKGROUND

Conventional computing technologies collect information associated with unresponsive or improperly functioning software operating on a computing device. For example, crash-reporting technology collects post-error debug information of an application that has crashed or stopped responding on the computing device. Further, such technology can analyze such information and send available solutions to a user of the device.

In another example, conventional computing technologies provide information to a user indicating available updates to application(s) installed on the user's computing device. Then, such technologies prompt the user to install the available updates.

However, conventional computing technologies reduce a user's experience(s) associated with a computing device, among other deficiencies, by delaying communication of information indicating updates associated with hardware and/or software of the computing device, and/or by requiring additional effort or understanding on the part of the user.

The above-described deficiencies of today's techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with monitoring contextual and performance information of a device for anticipatorily sending update information to the device.

For instance, an embodiment includes receiving, by a service component (e.g., a network-based service including any form, or combination, of wired service, wireless service, such as a cloud-based service, device service or component service, such as a thumbdrive service), which is associated with a first computing device, e.g., a server, contextual information indicating portion(s) of an operating environment of a second computing device, e.g., a client of the network-based service, receiving user preference information, or receiving information about inferred future activity, current activity, or past activity of the user. In one example, the contextual information can include a configuration of hardware, e.g., central processing unit (CPU), memory, disk storage, etc. and/or software, e.g., application(s), operating system (OS), etc. of the second computing device, a location of the second computing device, a configuration of a network, a service, etc. that is communicatively coupled to the second computing device, etc. Accordingly, any of contextual information, user preference or user activity can be a basis for communication of configuration information.

Further, the embodiment includes receiving performance information that is associated with one or more operations being performed by the second computing device in the operating environment. For example, the performance information can indicate: a consumption of memory that is associated with an operating system of the second computing device, software of the second computing device, firmware of the second computing device, etc., input/output (I/O) bandwidth that is associated with execution of the operating system, the software, the firmware, etc., bandwidth of the network, latency that is associated with processing data via the network, etc.

Then, in response to correlating the contextual information with the performance information, configuration (or update) information is communicated to the second computing device. For example, the configuration information can include a recommendation, an offer, etc. to upgrade, update, not upgrade, not update, etc. the operating system, the software, the firmware, and/or hardware of the second computing device. In another example, the configuration information can include a recommendation to utilize a network, a communication protocol, etc.

In an embodiment, the correlating the contextual information with the performance information further includes inferring causation of a portion of the performance information from a portion of the contextual information. In another embodiment, the correlating further includes receiving other information (1) indicating a configuration of hardware and/or software of a third computing device and/or (2) indicating performance of the third computing device, and determining the configuration information based on the other information.

In yet another embodiment, the correlating further includes determining causation of a portion of the performance information from a portion of the contextual information, and communicating a portion of the configuration information to a third computing device, e.g., a system that is associated with receiving information regarding operation of the hardware and/or the software.

In one embodiment, the correlating further includes receiving other information that is associated with communication(s), e.g., queries, searches, etc. performed, e.g., by third parties, about hardware and/or software issue(s) associated with the contextual information and/or the performance information, and determining causation of a portion of the performance information from a portion of the contextual information based on the other information that is associated with the communication(s).

In one non-limiting implementation, an interface component can receive, from a client, contextual information indicating an operating environment of the client and performance information that is associated with operation(s) being performed by the client based on the operating environment. Further, a service component can infer a relationship between the contextual information and the performance information to obtain correlation information, and the interface component can send, based on correlation information, configuration information, or update information, to the client.

In an embodiment, the contextual information includes information indicating a configuration of hardware and/or software of a client, a configuration of a network that is communicatively coupled to the client, and/or information indicating a location of the client. Further, the configuration information includes information indicating a recommendation to update, upgrade, not update, not upgrade, etc. software and/or hardware of the client.

In another embodiment, the performance information includes information indicating a consumption of memory that is associated with an operating system of the client, software of the client, and/or firmware of the client, an input/output bandwidth that is associated with execution, by the client, of the operating system, the software, and/or the firmware, a bandwidth of a network that is communicatively coupled to the client, and/or a latency that is associated with the network.

In another non-limiting implementation, a method can include storing, by a computing device, contextual information indicating portion(s) of an operating environment that is associated with portion(s) of operation(s) performed by the computing device. Further, the method can include sending the contextual information and performance information that is associated with the portion(s) of the operation(s) to a service component. Furthermore, the method can include receiving, based on the contextual information and the performance information, configuration information from the service component for configuring the computing device.

In one embodiment, the storing the contextual information further includes populating a cache with portion(s) of the contextual information to obtain cached information, and sending portion(s) of the cached information to the service component. In another embodiment, the method can include configuring software and/or hardware of the computing device based on the configuration information.

In another embodiment, a method can include receiving, by a service component of a first computing device, contextual information from clients indicating respective operating environments of the clients and storing the contextual information in a data store; receiving performance information that is associated with respective operations being performed by the clients in the respective operating environments; and storing the performance information in the data store. Then, in response to correlating the contextual information with the performance information utilizing the data store, a recommended configuration of a second computing device can be inferred. Further, the recommended configuration can be communicated to the second computing device.

Other embodiments and various non-limiting examples, scenarios, and implementations are described in more detail below.

BRIEF DESCRIPTION OF THE DRAWINGS

Various non-limiting embodiments are further described with reference to the accompanying drawings in which:

FIGS. 6-9 illustrate exemplary processes according to various embodiments;

DETAILED DESCRIPTION

Overview

Figure 1:
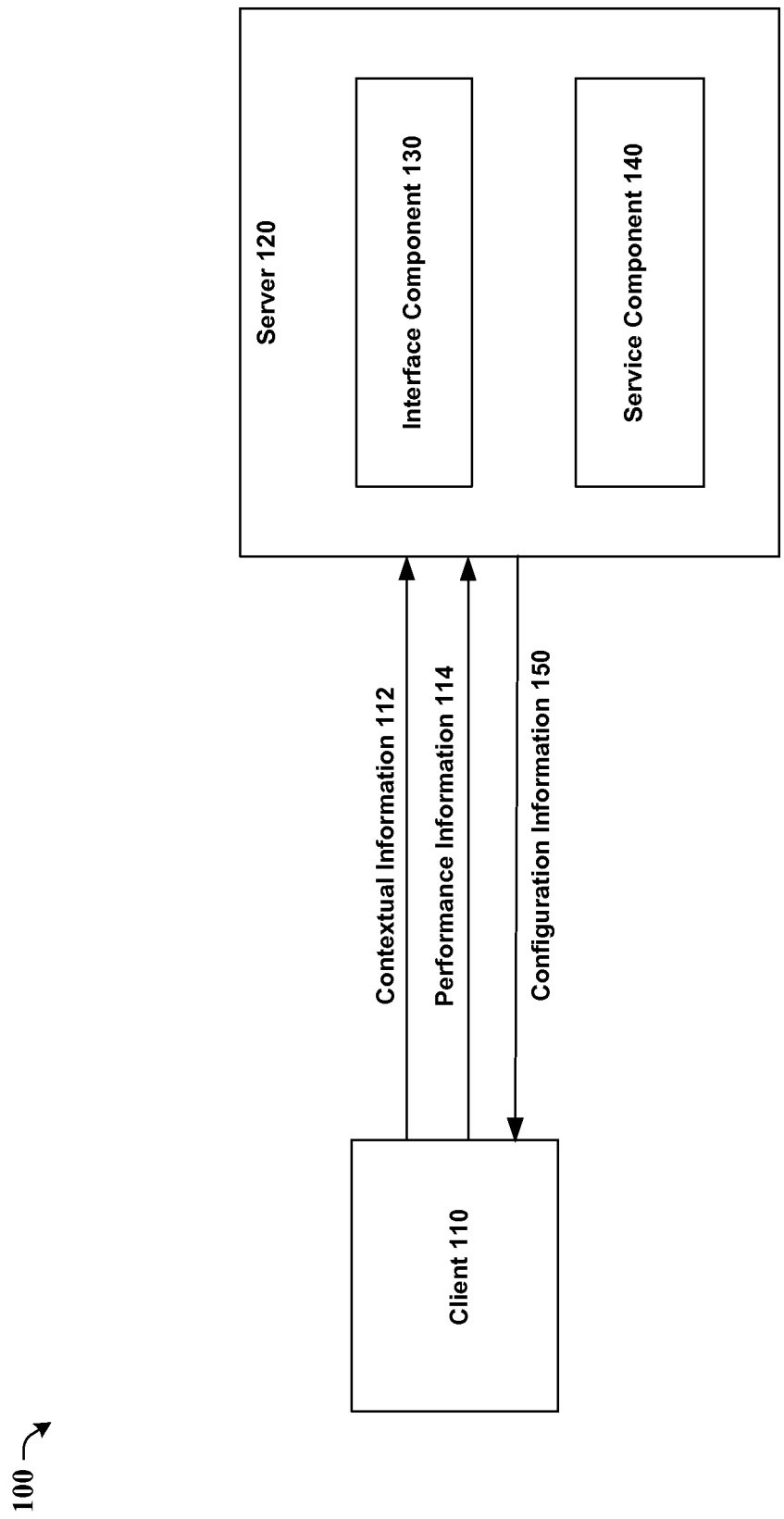
FIG. 1 illustrates an exemplary environment for monitoring performance information of a device for anticipatorily sending update information to the device according to an embodiment.

As indicated in the background, conventional computing technologies do not monitor operating performance of a device and anticipatorily send update information to the device based on the operating performance. In consideration of these and other deficiencies of the conventional technologies, the subject matter disclosed herein relates to correlating contextual and performance information of the device, and sending configuration information to the device based on such information.

In one embodiment, a method comprises receiving, by a service component of a first computing device, contextual information indicating one or more portions of an operating environment of a second computing device; and receiving performance information that is associated with one or more operations being performed by the second computing device in the operating environment. Then, in response to correlating the contextual information with the performance information, communicating configuration information to the second computing device.

In another non-limiting implementation, a computer-readable storage medium is provided comprising computer executable instructions that, in response to execution, cause a computing device to perform operations. The operations include storing, by the computing device, contextual information indicating portion(s) of an operating environment that is associated with portion(s) of the operations.

Further, the method can include sending the contextual information and performance information that is associated with at least one operation of the operations being performed by the computing device to a service component. Furthermore, the method can include receiving, based on the contextual information and the performance information, configuration information from the service component for configuring the computing device.

In one embodiment, a system comprises an interface component stored in a computable readable storage medium configured to: receive, from a client, contextual information indicating an operating environment of the client and performance information that is associated with one or more operations being performed by the client based on the operating environment. Further, the interface component can send, based on correlation information, update information to the client. Furthermore, a service component can infer a relationship between the contextual information and the performance information to obtain the correlation information.

In another embodiment, a method can include receiving, by a service component of a first computing device, contextual information from clients indicating respective operating environments of the clients and storing the contextual information in a data store, such as a database; receiving performance information that is associated with respective operations being performed by the clients in the respective operating environments and storing the performance information in the data store; in response to correlating the contextual information with the performance information utilizing the data store, inferring a recommended configuration of a second computing device; and communicating the recommended configuration to the second computing device.

Such techniques enable monitoring performance information of a device for anticipatorily sending configuration information to the device.

Figure 2:
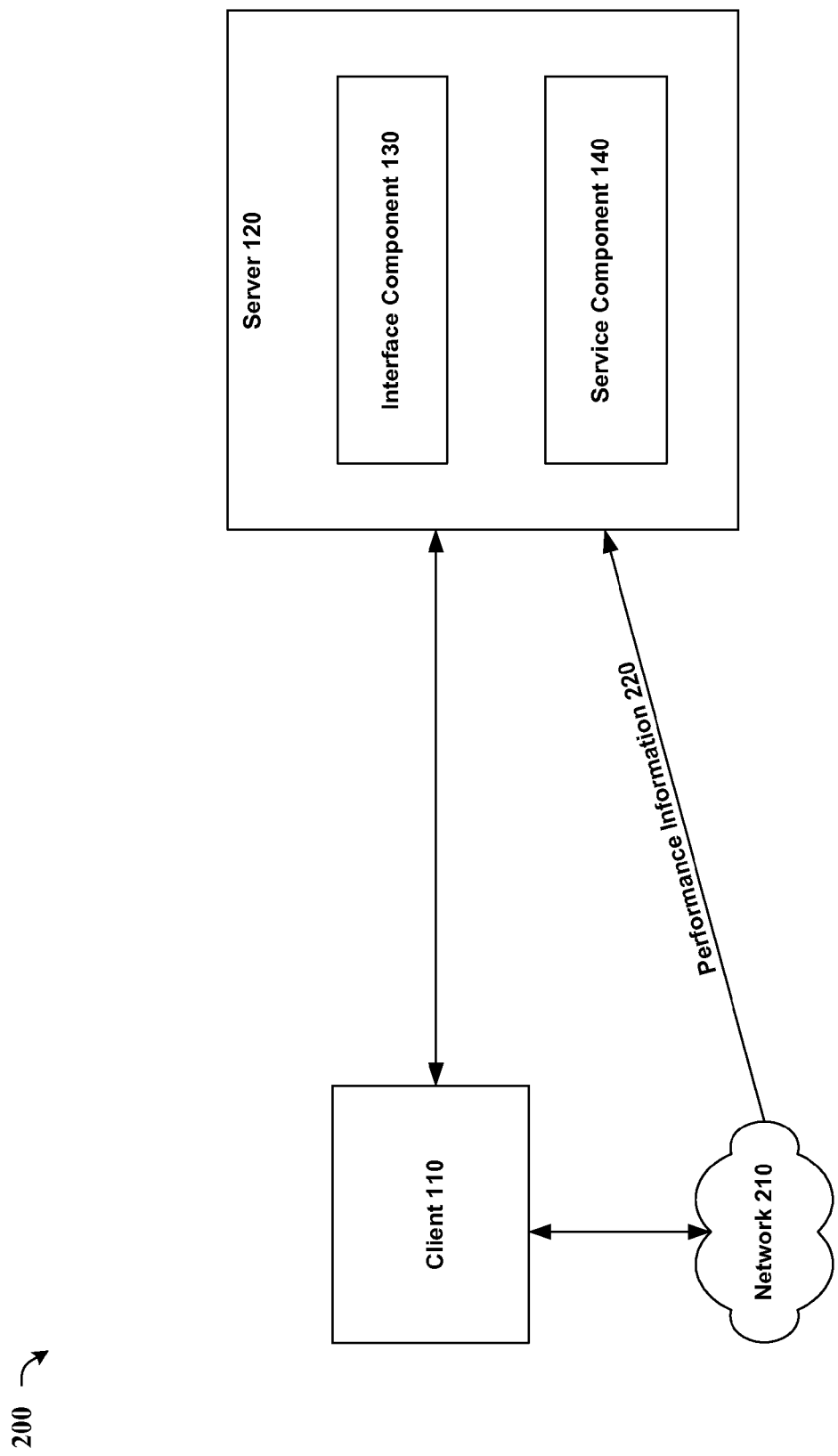
FIG. 2 illustrates another exemplary environment for monitoring performance information of a device for anticipatorily sending update information to the device according to an embodiment.
Figure 3:
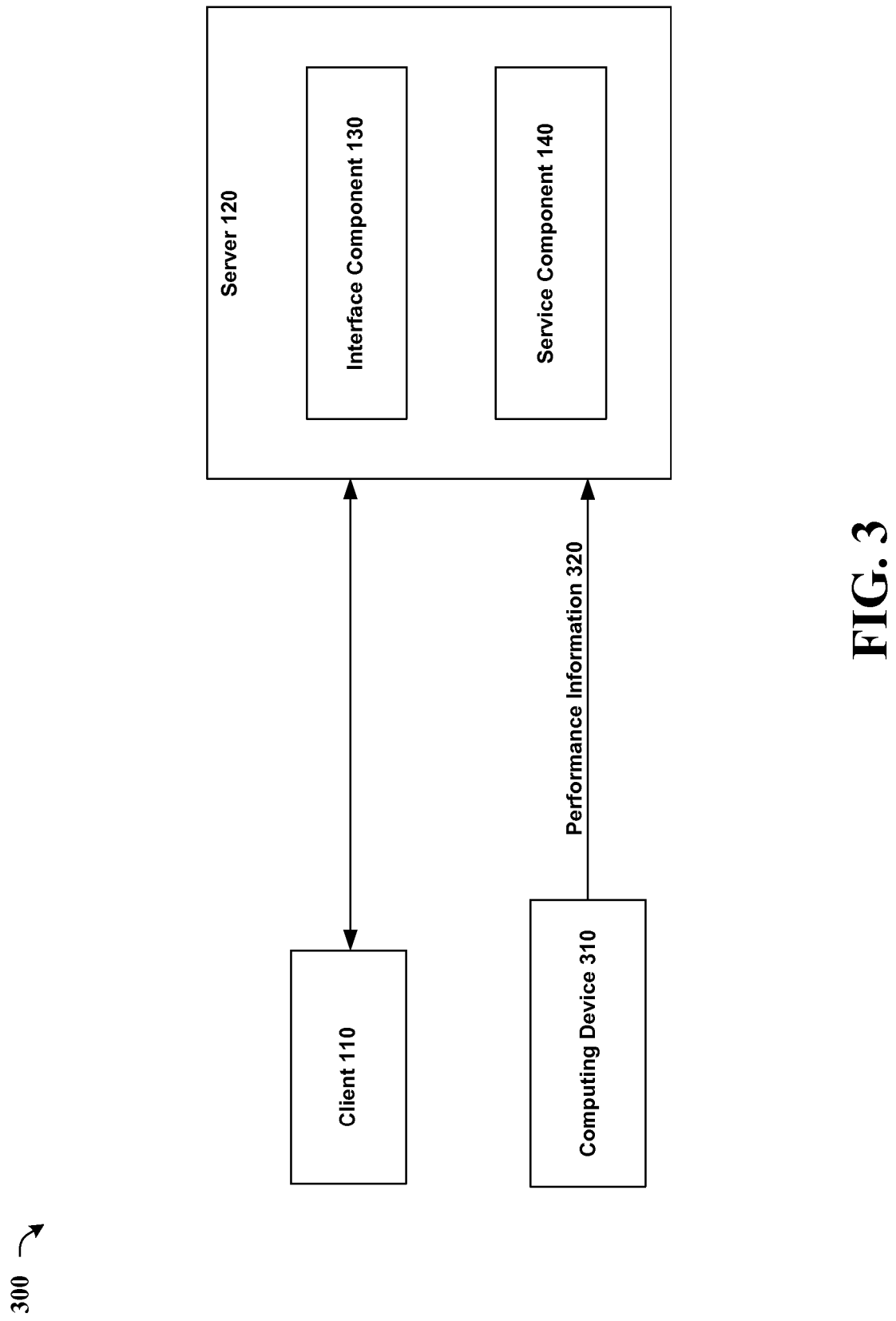
FIG. 3 illustrates yet another exemplary environment for monitoring performance information of a device for anticipatorily sending update information to the device according to an embodiment.

Monitoring Performance Information of a Device for Anticipatorily Sending Configuration Information to the Device Referring now to FIGS. 1-3, service environments (100, 200, 300) including sever 120, e.g., associated with a network based information service, are depicted according to various embodiments. For the avoidance of doubt, any network service or service component described in the specification, depicted in the drawings, or claimed herein is applicable to any service or component to which the device can interface, including any form of wired, wireless, or device or component-based communication, including, but not limited to, Ethernet, synchronous optical network (SONET), asynchronous transfer mode (ATM), universal serial bus (USB), or so-called 'sneakernet' communication via shared devices, such as, but again not limited to, floppy disks or jump drives. Thus, terms such as "service component" or "network based service" shall be construed consistent such view of what a service component or network based service can be.

Server 120 includes interface component 130 and service component 140. Interface component 130 can receive, e.g., from client 110 via the network based information service, contextual information 112 indicating an operating environment, e.g., service environment 100, service environment 200, service environment 300, etc. of client 110. In an aspect, contextual information 112 can include information indicating a configuration of an operating system of client 110, software of client 110, firmware of client 110, and/or hardware of client 110; a configuration of network 210 that is communicatively coupled to client 110; and/or information indicating a location of client 110. In addition to contextual information, user preference information can be received, information about inferred future activity, current activity, or past activity of the user can be received as input. Accordingly, any of contextual information, user preference or user activity can be a basis for communication of configuration information.

Further, interface component 130 can receive from client 110, network 210, and computing device 310, information including performance information 114, performance information 220, and performance information 320, respectively. In an embodiment, performance information 114 can be associated with operation(s) performed by client 110, e.g., via an operating system, software, firmware, etc. based on the operating environment. In one aspect, performance information 114 can include information indicating a consumption of memory that is associated with the operation(s), and/or information indicating an input/output bandwidth that is associated with the operation(s).

In another embodiment, performance information 220 can include information indicating a bandwidth of network 210 and/or a latency that, for example, is associated with processing data via network 210. In yet another embodiment, performance information 320 can include information indicating a configuration of hardware of computing device 310. In various aspects, computing device can be communicatively coupled to network 210, communicatively coupled to a network different from network 210, etc. In one aspect, performance information 320 can include information indicating a configuration of software, hardware, firmware, an operating system, etc. of computing device 310 and/or a performance of computing device 310.

Various aspects of exemplary, non-limiting embodiments disclosed herein can monitor contextual information 112 and performance information, e.g., performance information 114, performance information 220, performance information 320, etc. to anticipatorily and/or proactively provide, send, etc. update information, upgrade information, configuration information 150, etc. to client 110, e.g., for identifying application(s), software patch(es), software update(s), operating system update(s), firmware update(s), hardware update(s), etc. to improve operating performance of client 110.

As such, in one embodiment, service component 140 can be configured to correlate contextual information 112 with performance information 114, performance information 220, and/or performance information 320. For example, service component 140 can infer a relationship between contextual information 112 and performance information 114, performance information 220, and/or performance information 320 to obtain, derive, compute, etc. correlation information.

In one example, service component 140 can infer, based on performance information 114 indicating an excessive amount of memory and/or CPU cycles being consumed by client 110, correlation information indicating that client 110 is performing slowly, acting sluggishly, etc. in response to software and/or an application being executed by client 110, e.g., as indicated by contextual information 112. As such, service component 140 can infer causation of at least a portion of performance information 114 from one or more portions of contextual information 112.

For example, in one or more aspects, service component 140 can include one or more data structures (not shown) associated with the contextual information and the correlation information, and can be centralized or distributed, potentially across multiple devices and/or schemas. In accordance therewith, in order to provide for or aid in inference(s), correlation(s), described herein, service component 140 can examine the entirety or a subset of the data available and can provide for reasoning about or infer states of respective system(s), environment(s), and/or user(s) from a set of observations as captured via events and/or data.

Further, inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action, correlation(s), etc. in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data.

Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Referring again to FIGS. 1-3, interface component 130 can send, communicate, etc. configuration information 150, the update information, the upgrade information, etc. to client 110 based on the correlation information. In an aspect, configuration information 150 can (1) include a recommendation to update, upgrade, etc. an operating system, software, firmware, hardware, etc. of client 110; (2) include a recommendation to not install an update, an upgrade, etc. of the operating system, the software, the firmware, the hardware, etc.; (3) identify application(s), software, patch(es), software update(s), hardware update(s), firmware update(s), operating system update(s), etc. that can be installed, performed on, etc. client 110, e.g., for improving operating performance of client 110; and/or (4) include a recommendation to utilize a network protocol and/or a communication protocol.

For example, in response to contextual information 112 indicating that client 110 was communicatively coupled to a first device, e.g., a peripheral device, a printer, a scanner, a gaming device, etc. interface component 130 can send configuration information 150, e.g., derived via service component 140, to client 110 indicating that hardware and/or software update(s), software patch(es), operating system update(s), firmware update(s), etc. associated with a second device (or a second peripheral device) that, e.g., is not communicatively coupled to client 110, be skipped or not performed. In another example, in response to contextual information 112 indicating a pattern, a series, etc. of files being selected via client 110, interface component 130 can send configuration information 150, e.g., derived via service component 140, to client 110 indicating hardware and/or software update(s), software patch(es), operating system update(s), firmware update(s), etc. associated with the files to install in client 110.

In another aspect, in response to contextual information 112 indicating a pattern, a series, etc. of a type of software, application, operating system, firmware, etc. being installed on client 110, interface component 130 can send configuration information 150, e.g., derived via service component 140, to client 110 indicating, recommending, etc. that hardware and/or software update(s), software patch(es), operating system update(s), firmware update(s), etc. be made to client 110 based on the type of software, application, operating system, firmware, etc. being installed on client 110.

In an aspect illustrated by FIG. 3, server 120 can receive configuration information from computing device 310 indicating a configuration of hardware and/or software of computing device 310. Further, server 120 can receive performance information 320 from computing device 310, e.g., indicating a consumption of memory that is associated with an operating system, software, firmware, etc. being executed via computing device 310. Furthermore, service component 140 can determine, infer, etc. configuration information 150 based on the configuration information and performance information 320. For example, in response to operating system, hardware, firmware, and/or software aspect(s) of computing device 310 being compatible with client 110, service component 140 can recommend, via configuration information 150, update(s) be made to an operating system, hardware, firmware, and/or software of client 110.

In another aspect, server 120 can receive information of communication(s), e.g., network queries, social network queries, etc. made via computing device 310. Further, service component 140 can determine causation of at least a portion of performance information 114, 220, 320, etc. from portion(s) of the information of the communication(s). As such, service component 140 can correlate and/or leverage knowledge, e.g., about spike(s) in third party searches, network queries, messages, etc., for example, associated with hardware and/or software issues, to determine, infer, etc. configuration information 150.

Figure 4:
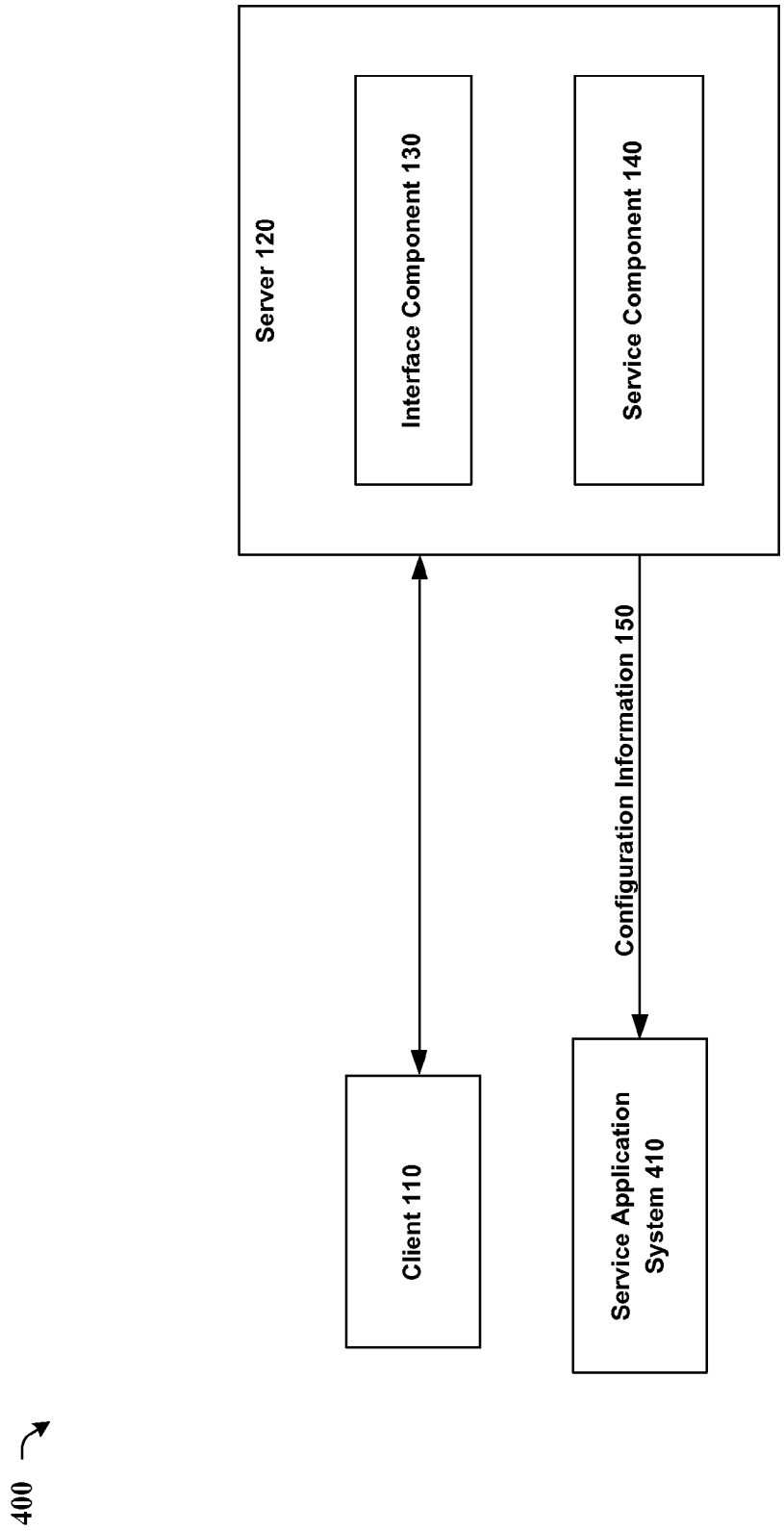
FIG. 4 illustrates an exemplary environment including a service application system according to an embodiment.

In one aspect illustrated by FIG. 4, service component 140 can be configured to communicate at least a portion of configuration information 150 to a computing device of service application 410, e.g., which can be associated with a source, manufacturer, developer, etc. of hardware, firmware, an operating system, software, etc. operating on and/or communicatively coupled to client 110, e.g., for recording information, logs, error logs, etc. associated with operation(s) of client 110.

Figure 5:
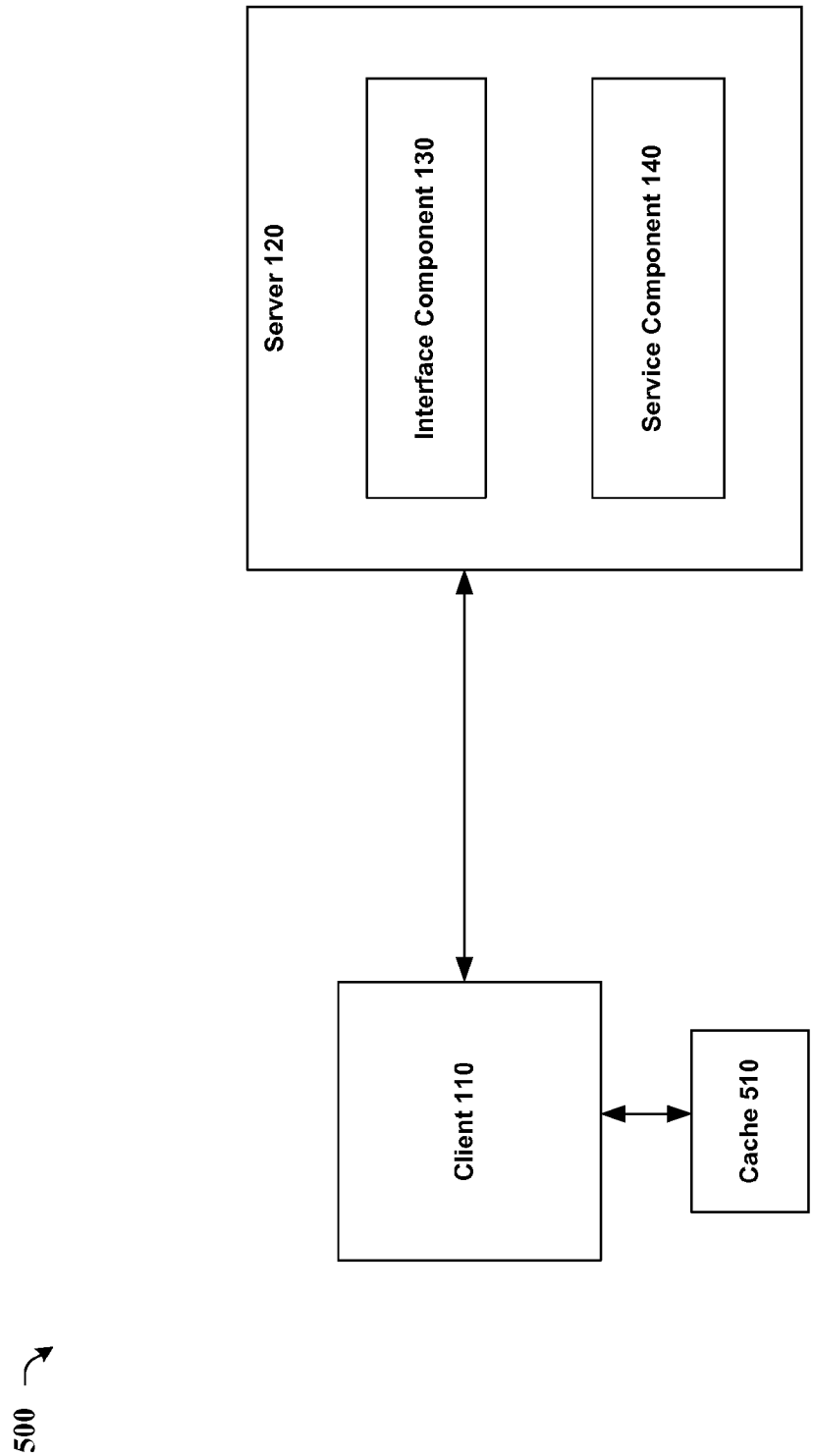
FIG. 5 illustrates an exemplary environment including a cache according to an embodiment.

Now referring to FIG. 5, client 110 can be associated with a computer-readable storage medium comprising computer executable instructions that, in response to execution, cause client 110 to store contextual information indicating one or more portions of operating environment 500. Further, client 110 can send the contextual information and performance information that is associated with at least one operation of operations performed by client 110 to server 120, e.g., interface component 130. Furthermore, client 110 can receive, based on the contextual information and the performance information, configuration information, e.g., from service component 140, for configuring client 110.

In one aspect, the contextual information can include information indicating a configuration of hardware of client 110 and/or software of client 110, a configuration of a network (not shown) that is communicatively coupled to client 110, and/or information indicating a location of client 110.

In another aspect, the performance information can be associated with the at least one operation, e.g., indicating a consumption of memory that is associated with an operating system of client 110, software being executed by client 110, firmware being executed by client 110, etc. In yet another aspect, client 110 can populate cache 510 with at least a portion of the contextual information to obtain cached information. Further, client 110 can send at least a portion of the cached information to server 120, e.g., service component 140. In one aspect, client 110 can configure software, hardware, firmware, an operating system, etc. of client 110 based on the configuration information.

Figure 6:
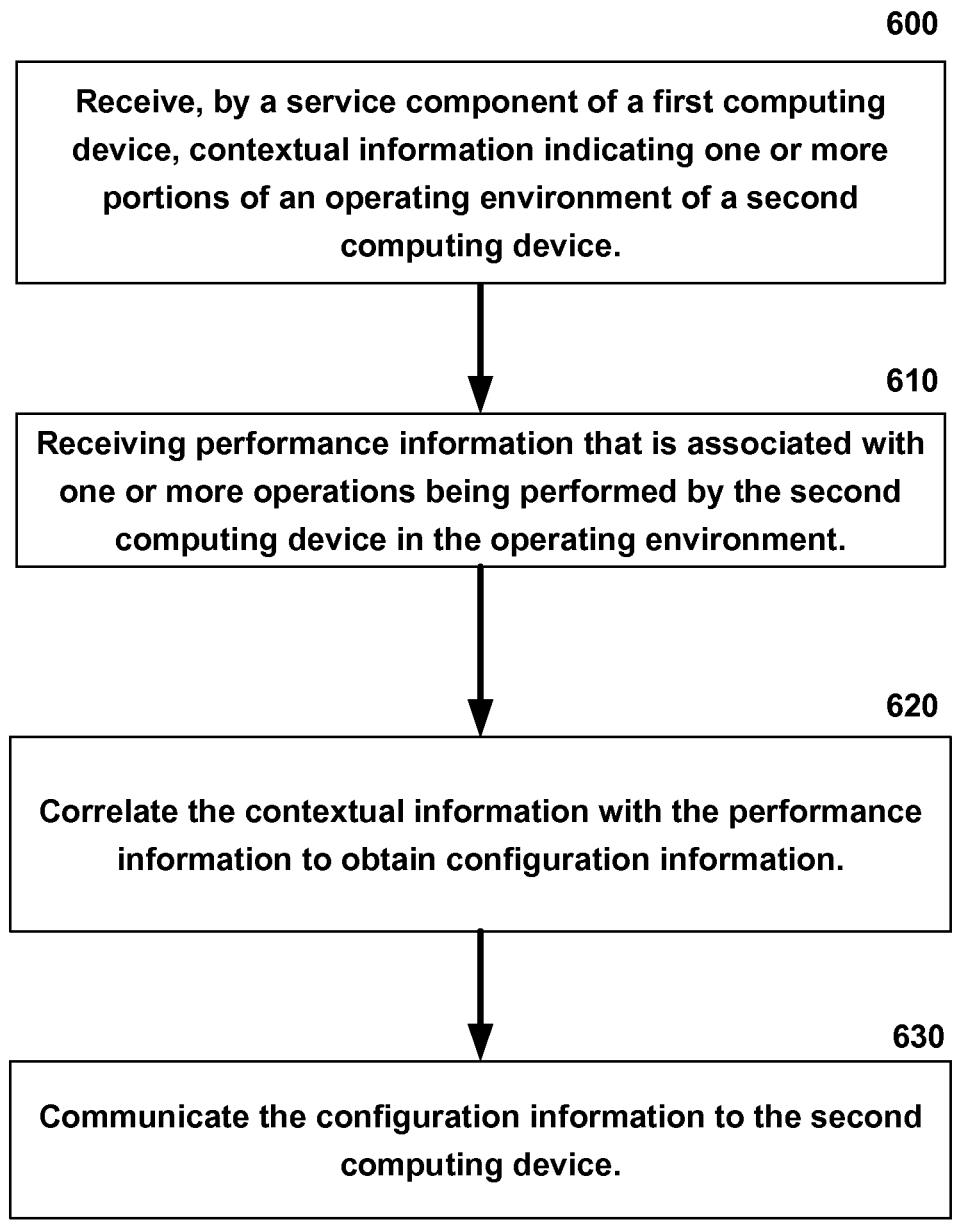

FIG. 6 is a flow diagram illustrating an exemplary non-limiting embodiment for monitoring performance information of a device for anticipatorily sending update information to the device according to an embodiment. At 600, a service component of a first computing device can receive contextual information indicating one or more portions of an operating environment of a second computing device. At 610, performance information that is associated with one or more operations being performed by the second computing device in the operating environment can be received, e.g., by the first computing device. At 620, the contextual information can be correlated with the performance information to obtain configuration information. At 630, the configuration information can be communicated to the second computing device.

In one embodiment, the contextual information includes information indicating a configuration of hardware, software, firmware, and/or an operating system of the second computing device. In another embodiment, the contextual information includes information indicating a location of the second computing device. In yet another embodiment, the contextual information includes information indicating a configuration of a network that is communicatively coupled to the second computing device.

In an embodiment, the performance information includes information indicating a consumption of memory that is associated with the hardware, the software, the firmware, and/or the operating system, e.g., being executed and/or operated by the second computing device. Another embodiment includes receiving information indicating an input/output bandwidth that is associated with the software, the firmware, the operating system, etc., e.g., being executed by the second computing device. Yet another embodiment includes receiving information indicating a bandwidth of a network that is communicatively coupled to the second computing device, and/or receiving information indicating a latency that is associated with processing data via the network.

FIG. 7 is a flow diagram illustrating another exemplary non-limiting embodiment for monitoring performance information of a device for anticipatorily sending update information to the device according to an embodiment. At 700, contextual information indicating portion(s) of an operating environment that is associated with at least a portion of operation(s) performed by a computing device can be stored by the computing device. At 710, the contextual information and performance information that is associated with an operation of the operation(s) can be sent by the computing device to a service component. At 720, configuration information sent by the service component can be received, by the computing device based on the contextual information and the performance information, from the service component for configuring the computing device. At 730, software, firmware, an operating system, and/or hardware of the computing device can be configured, e.g., by the computing device, based on the configuration information.

Figure 8:
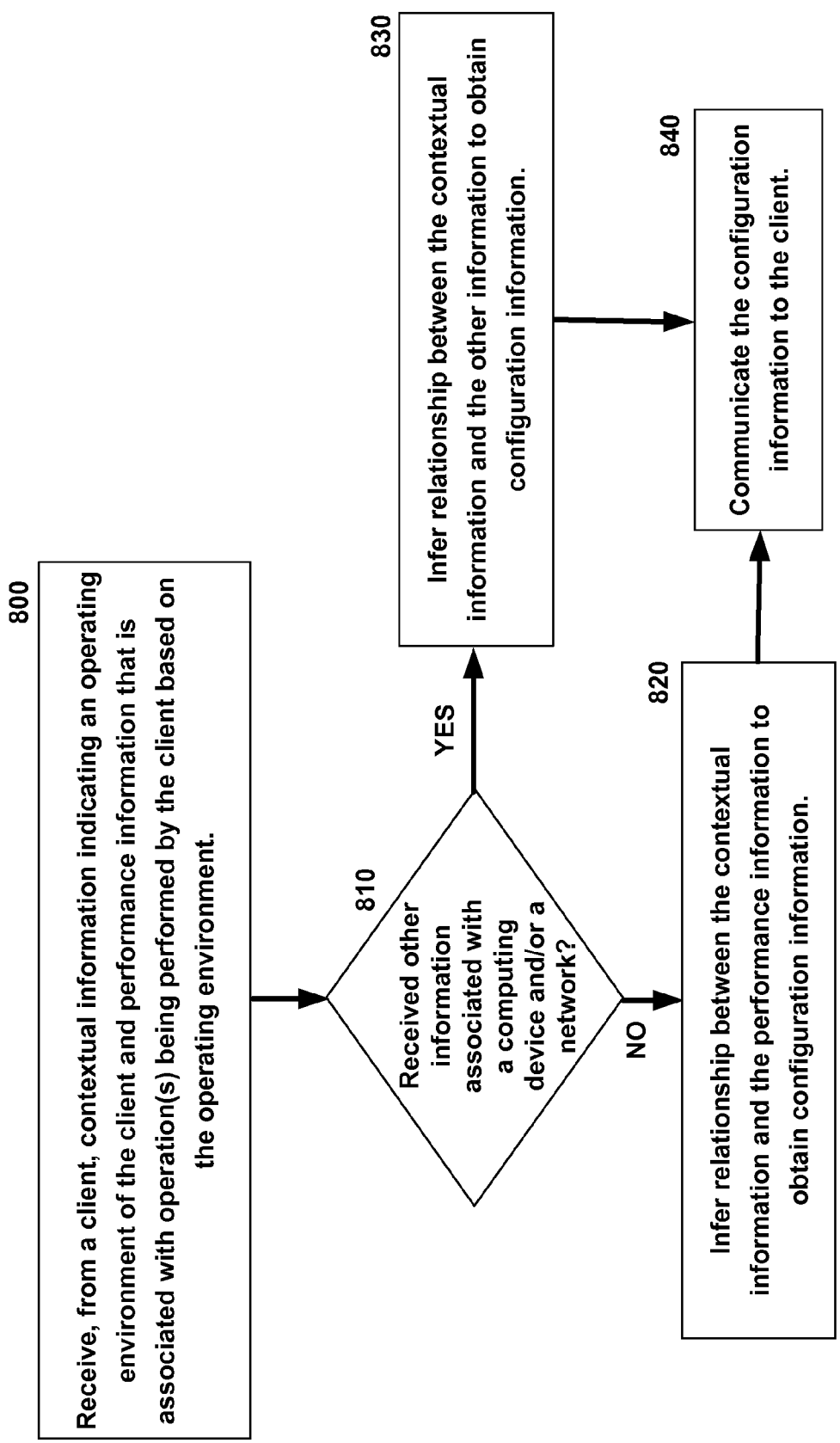

FIG. 8 is a flow diagram illustrating yet another exemplary non-limiting embodiment for monitoring performance information of a device for anticipatorily sending update information to the device according to an embodiment. At 800, contextual information indicating an operating environment of a client, and performance information that is associated with operation(s) being performed by the client based on the operating environment, can be received from the client. At 810, if other information that is associated with a computing device, e.g., of another client, and/or a network is received, flow continues to 830, at which a relationship between the contextual information and the other information can be inferred to obtain configuration information; otherwise, flow continues to 820, at which a relationship between the contextual information and the performance information can be inferred to obtain the configuration information.

Flow continues from 820 and 830 to 840, at which the configuration information can be communicated to the client. For example, in an embodiment, the configuration information can include recommendations for updating at least one of hardware and/or software of the client.

Figure 9:
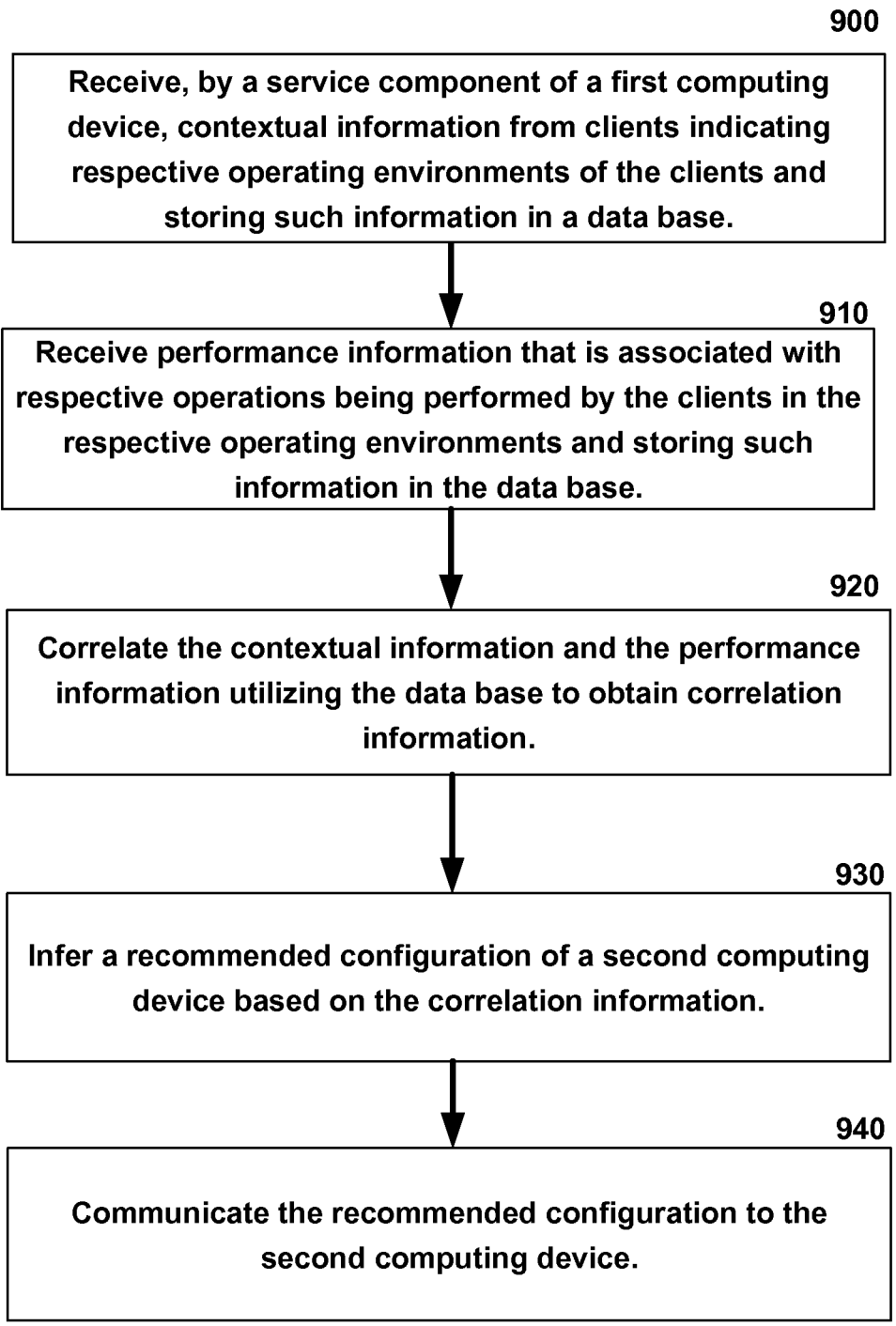

FIG. 9 is a flow diagram illustrating an exemplary non-limiting embodiment for monitoring the performance of clients for anticipatorily sending update, or configuration, information to a device according to an embodiment. At 900, contextual information indicating respective operating environments of the clients can be received from the clients and stored in a data store. At 910, performance information that is associated with respective operations being performed by the clients in the respective operating environments can be received and stored in the data store. At 920, the contextual information and the performance information can be correlated, utilizing the data store, to obtain correlation information. At 930, a recommended configuration of a second computing device can be inferred based on the correlation information. At 940, the recommended configuration information can be communicated to the second computing device.

Exemplary Networked and Distributed Environments

One of ordinary skill in the art can appreciate that the various embodiments for monitoring contextual and performance information of a device for anticipatorily sending update information to the device described herein can be implemented in connection with any computer or other client device, e.g., client 110, server 120, etc. Such device can be deployed as part of a computer network or in a distributed computing environment, and can be connected to any kind of data store where media may be found.

In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in mechanisms for performing operations associated with monitoring contextual and performance information of a device described for various embodiments of the subject disclosure.

Figure 10:
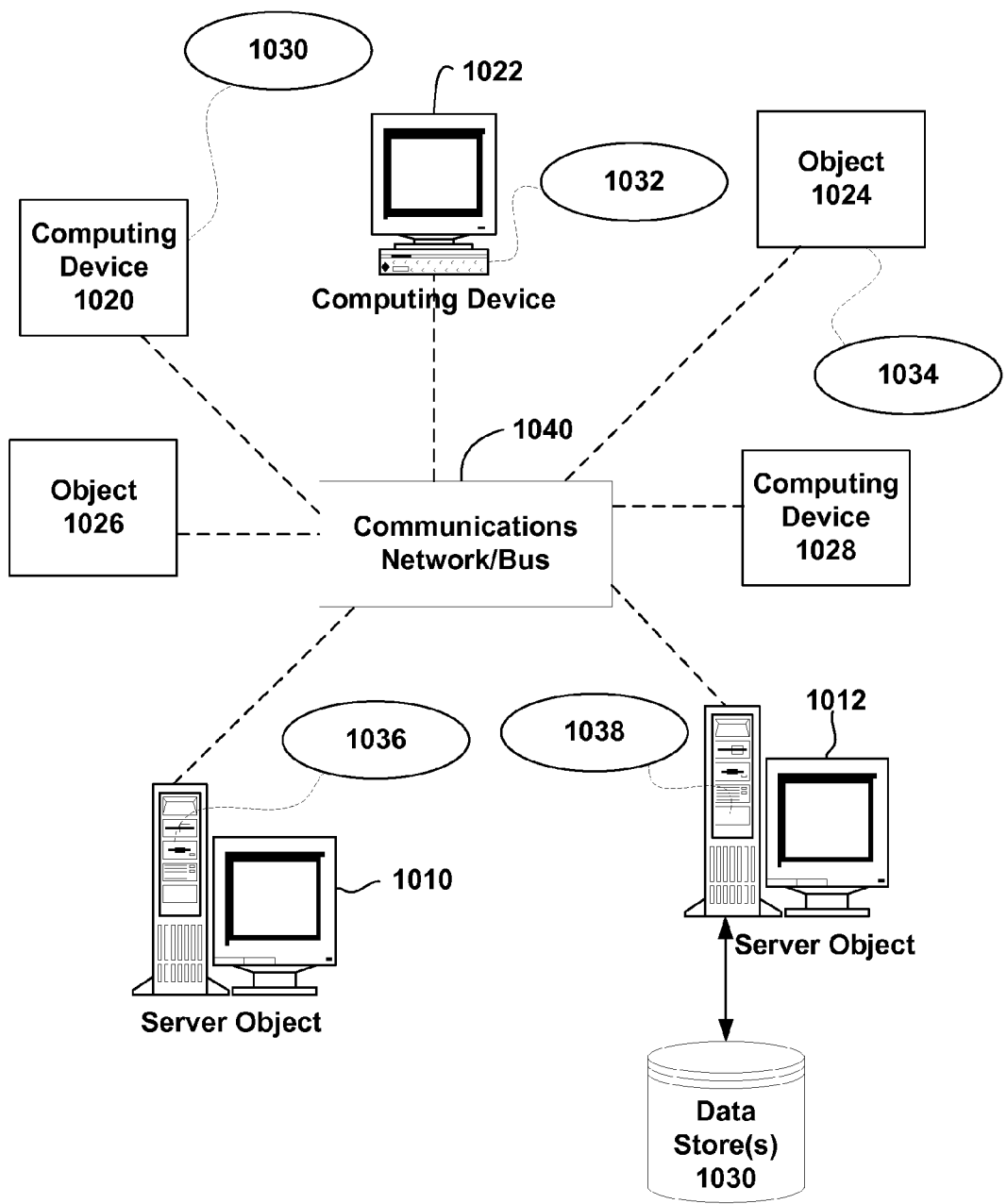
FIG. 10 is a block diagram representing exemplary non-limiting networked environments in which various embodiments described herein can be implemented.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038. It can be noted that computing objects 1010, 1012, etc. and computing objects or devices 1020, 1022, 1024, 1026, 1028, etc. may comprise different devices, such as PDAs, audio/video devices, mobile phones, MP3 players, personal computers, laptops, etc.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1040, either directly or indirectly. Even though illustrated as a single element in FIG. 10, communications network/bus 1040 may comprise other computing objects and computing devices that provide services to the system of FIG. 10, and/or may represent multiple interconnected networks, which are not shown. Each computing object 1010, 1012, etc. or computing objects or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the techniques for monitoring contextual and performance information of a device provided in accordance with various embodiments of the subject disclosure.

There are varieties of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems for monitoring contextual and performance information of a device as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client, e.g., client 110, is usually a computer, that accesses shared network resources provided by another computer, e.g., server 120. In the illustration of FIG. 10, as a non-limiting example, computing objects or devices 1020, 1022, 1024, 1026, 1028, etc. can be thought of as clients and computing objects 1010, 1012, etc. can be thought of as servers in which computing objects 1010, 1012, etc. provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances. Any of these computing devices may be processing data, or requesting transaction services or tasks that may implicate the techniques for monitoring contextual and performance information of a device as described herein for one or more embodiments.

A server, e.g., server 110, is typically a remote computer system accessible over a remote or local network, such as the Internet or wireless network infrastructures. The client process may be active in a first computer system, and the server process may be active in a second computer system, e.g., related to embodiments associated with FIGS. 1-9 disclosed herein, communicating with one another over a communications medium, thus providing distributed functionality and allowing multiple clients to take advantage of the information-gathering capabilities of the server. Any software objects utilized pursuant to the techniques for monitoring contextual and performance information of a device can be provided standalone, or distributed across multiple computing devices or objects.

In a network environment in which the communications network/bus 1040 is the Internet, for example, e.g., related to embodiments associated with FIGS. 1-9 disclosed herein, the computing objects 1010, 1012, etc. can be Web servers with which the client computing objects or devices 1020, 1022, 1024, 1026, 1028, etc. communicate via any of a number of known protocols, such as HTTP. Servers 1010, 1012, etc. may also serve as client computing objects or devices 1020, 1022, 1024, 1026, 1028, etc., as may be characteristic of a distributed computing environment.

Exemplary Computing Device

Figure 11:
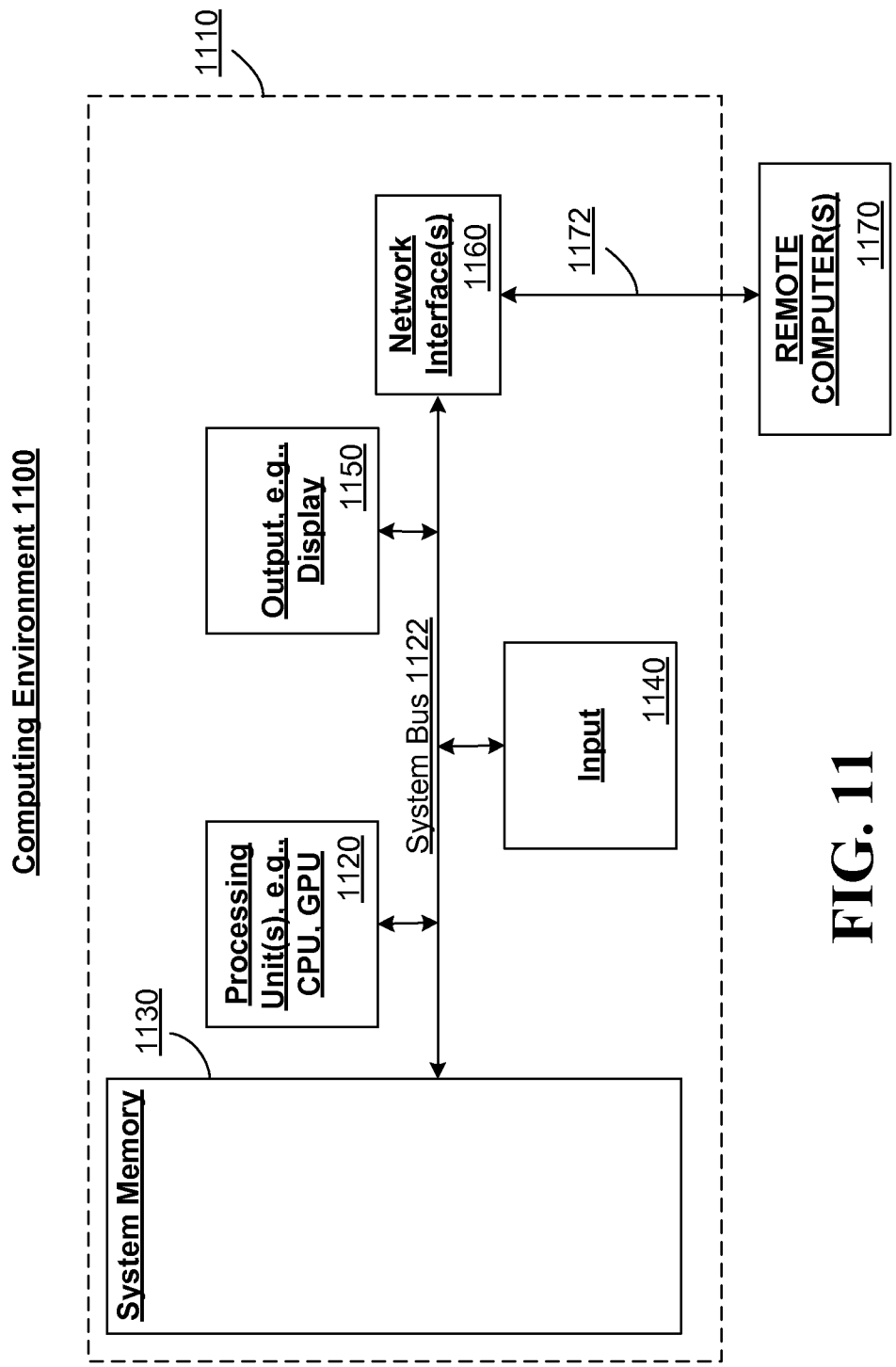
FIG. 11 is a block diagram representing an exemplary non-limiting computing system or operating environment in which one or more aspects of various embodiments described herein can be implemented.

As mentioned, advantageously, the techniques described herein can be applied to any device where it is desirable to monitor contextual and performance information of a device. It is to be understood, therefore, that handheld, portable and other computing devices and computing objects of all kinds are contemplated for use in connection with the various embodiments, i.e., anywhere that a device can enable a server to perform operations associated with monitoring contextual and performance information of a device. Accordingly, the below general purpose computer described below in FIG. 11 is but one example of a computing device. Additionally, a server, or a database server, e.g., associated with the service application described above, can include one or more aspects of the below general-purpose computer.

Although not required, embodiments can partly be implemented via an operating system, for use by a developer of services for a device or object, and/or included within application software, e.g., associated with server 120, which operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. Neither is the computing environment 1100 interpreted as having any dependency or requirement relating to any one or combination of components illustrated in the exemplary operating environment 1100.

With reference to FIG. 11, an exemplary remote device for implementing one or more embodiments includes a general-purpose computer, or computing device, in the form of computer 1110. Components of computer 1110 may include, but are not limited to, a processing unit 1120, a system memory 1130, and a system bus 1122 that couples various system components including the system memory to the processing unit 1120.

Computer 1110 typically includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, memory 1130 may also include an operating system, application programs, other program modules, and program data.

A user can enter commands and information into computer 1110 through input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

Computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to computer 1110. The logical connections depicted in FIG. 11 include a network 1172, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. that enables applications and services to take advantage of the techniques for monitoring contextual and performance information of a device described herein. Thus, embodiments herein are contemplated from the standpoint of an API (or other software object), as well as from a software or hardware object that implements one or more aspects of such techniques. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal, such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be noted that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that can be implemented in accordance with the described subject matter will be better noted with reference to the flowcharts of the various figures. While for purposes of simplicity of explanation, the methodologies are shown and described as a series of blocks, it is to be understood and noted that the claimed subject matter is not limited by the order of the blocks, as some blocks may occur in different orders and/or concurrently with other blocks from what is depicted and described herein. Where non-sequential, or branched, flow is illustrated via flowchart, it can be noted that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be affected across a plurality of devices. Accordingly, the embodiments are not to be limited to any single embodiment, but rather can be construed in breadth, spirit and scope in accordance with the appended claims.

What is claimed is:

1. A method, comprising:
   receiving, by a service component of a first computing device, one or more of contextual information indicating one or more portions of an operating environment of a second computing device or user activity information indicating at least one present, past or inferred future user activity for a user of the second computing device;
   receiving performance information that is associated with one or more operations being performed by the second computing device in the operating environment;
   correlating at least one of the contextual information or the user activity information with the performance information,
      the correlating including receiving, by the service component of the first computing device which receives the one or more of the contextual information or the user activity information, first information that is associated with one or more communications about at least one of one or more hardware issues or one or more software issues associated with at least one of the contextual information or the performance information; and
   in response to correlating the at least one of the contextual information or the user activity information with the performance information, anticipatorily communicating configuration information to the second computing device, the configuration information based at least in part on an inference from a probability distribution over states in accordance with a classification scheme that maps an input attribute vector associated with an input to a confidence that the input belongs to a class, the configuration information including a recommendation to at least one of not update software of the second computing device, not update hardware of the second computing device, not update an operating system of the second computing device, or not update firmware of the second computing device.

2. The method of claim 1, wherein the receiving the one or more of the contextual information or the user activity information comprises:
   receiving the contextual information indicating a location of the second computing device.

3. The method of claim 1, wherein the receiving the performance information further includes receiving, by a network based service, information indicating a consumption of memory that is associated with at least one of an operating system of the second computing device, software of the second computing device, or firmware of the second computing device.

4. The method of claim 1, wherein the receiving the performance information includes receiving, by a network based service, information indicating an input or output bandwidth that is associated with at least one of hardware of the second computing device, software of the second computing device, an operating system of the second computing device, or firmware of the second computing device.

5. The method of claim 1, wherein the receiving the performance information includes receiving, by a network based service, information indicating a bandwidth of a network that is communicatively coupled to the second computing device.

6. The method of claim 1, wherein the receiving the performance information includes receiving, by a network based service, information indicating a latency that is associated with processing data via a network that is communicatively coupled to the second computing device.

7. The method of claim 1, wherein the correlating further includes inferring causation of at least a portion of the performance information from one or more portions of the contextual information based at least in part on the first information, the one or more communications including at least one of one or more searches or one or more queries performed by one or more third parties about the at least one of the one or more hardware issues or the one or more software issues associated with at least one of the contextual information or the performance information.

8. The method of claim 1, wherein the correlating further includes:
   receiving other information indicating at least one of a configuration of hardware of a third computing device, a configuration of software of the third computing device, a configuration of an operating system of the third computing device, a configuration of firmware of the third computing device, or a performance of the third computing device; and
   determining the configuration information based at least in part on the other information.

9. The method of claim 1, wherein the correlating further includes:
   determining causation of at least a portion of the performance information from one or more portions of the contextual information; and
   communicating at least a portion of the configuration information to a third computing device.

10. The method of claim 1, wherein the correlating further includes:
   receiving other information that is associated with at least one communication that is associated with a third computing device; and
   determining causation of at least a portion of the performance information from one or more portions of the contextual information based at least in part on the other information.

11. The method of claim 1, wherein the anticipatorily communicating the configuration information to the second computing device further includes anticipatorily communicating a recommendation to utilize at least one of a network protocol or a communication protocol.

12. The method of claim 1, wherein the receiving the one or more of the contextual information or the user activity information comprises:
   receiving the user activity information indicating the at least one present, past or inferred future user activity for the user of the second computing device;
   wherein the correlating the at least one of the contextual information or the user activity information with the performance information comprises:
      correlating the user activity information with the performance information,
         the correlating including receiving, by the service component of the first computing device which receives the user activity information, the first information that is associated with the one or more communications about the at least one of the one or more hardware issues or the one or more software issues associated with the performance information; and
   wherein the communicating the configuration information comprises:
      in response to correlating the user activity information with the performance information, communicating the configuration information to the second computing device.

13. The method of claim 1, wherein the receiving the one or more of the contextual information or the user activity information comprises:
   receiving the contextual information indicating a pattern or series of files being selected via the second computing device; and
   wherein the anticipatorily communicating the configuration information comprises:
      anticipatorily communicating the configuration information indicating at least one of one or more updates or one or more software patches associated with the files to install in the second computing device.

14. The method of claim 1, wherein the receiving the one or more of the contextual information or the user activity information comprises:
   receiving the contextual information indicating a pattern or series of a type of at least one of software, application, operating system, or firmware being installed on the second computing device; and
   wherein the anticipatorily communicating the configuration information comprises:
      anticipatorily recommending that at least one of one or more updates or one or more software patches be made to the second computing device based at least in part on the type of the at least one of the software, the application, the operating system, or the firmware being installed on the second computing device.

15. The method of claim 1, wherein the receiving the first information comprises:
   receiving, by the service component of the first computing device which receives the one or more of the contextual information or the user activity information, the first information from one or more third parties, including at least one of one or more queries, one or more searches, or one or more messages from the one or more third parties, about the at least one of the one or more hardware issues or the one or more software issues associated with the at least one of the contextual information or the performance information.

16. A computer-readable storage device comprising computer executable instructions that, in response to execution, cause a computing device to perform operations, comprising:
   storing, by the computing device, one or more of contextual information indicating one or more portions of an operating environment that is associated with at least a portion of the operations, user preference information indicating at least one user preference or user activity information indicating at least one present, past or inferred future user activity;
   sending at least one of the contextual information, the user preference information or the user activity information and performance information that is associated with at least one operation of the operations being performed by the computing device to a service component; and
   receiving, based at least in part on the at least one of the contextual information, the user preference information or the user activity information and the performance information, configuration information from the service component for configuring the computing device, the configuration information based at least in part on an inference from a probability distribution over states in accordance with a classification scheme that maps an input attribute vector associated with an input to a confidence that the input belongs to a class, the configuration information including at least one of a recommendation to not update software of the computing device, a recommendation to not update hardware of the computing device, a recommendation to not update an operating system of the computing device, or a recommendation to not update firmware of the computing device.

17. A system, comprising:
   an interface component stored in a computable readable storage device configured to:
      receive, from a client, one or more of contextual information indicating an operating environment of the client, user preference information indicating a user preference or user activity information indicating a present, past or inferred future user activity, and performance information that is associated with one or more operations being performed by the client based at least in part on the operating environment, and
      send, based at least in part on correlation information, update information to the client, the update information including at least one of a recommendation to not update software of the client, a recommendation to not update hardware of the client, a recommendation to not update an operating system of the client, or a recommendation to not update firmware of the client; and
   a service component configured to infer a relationship between at least one of the contextual information, the user preference information or the user activity information, and the performance information to obtain the correlation information, the relationship inferred from a probability distribution over states in accordance with a classification scheme that maps an input attribute vector associated with an input to a confidence that the input belongs to a class.

18. The system of claim 17, wherein the performance information includes information indicating at least one of:
an operating system of the client; or
a latency that is associated with the network that is communicatively coupled to the client.

19. The system of claim 17, wherein the input includes at least one of one or more queries, one or more searches, or one or more messages by one or more third parties about at least one of one or more hardware issues or one or more software issues associated with at least one of the contextual information or the performance information.

20. A method, comprising:
receiving from clients, by a service component of a first computing device, one or more of contextual information indicating respective operating environments of the clients, user preference information indicating a user preference or user activity information indicating a present, past or inferred future user activity;
receiving performance information that is associated with respective operations being performed by the clients in the respective operating environments and storing the performance information in a data store;
in response to correlating at least one of the contextual information, the user preference information or the user activity information with the performance information utilizing the data store, inferring a recommended configuration of a specified client from a probability distribution over states in accordance with a classification scheme that maps an input attribute vector associated with an input to a confidence that the input belongs to a class; and
anticipatorily communicating the recommended configuration to the specified client, including at least one of recommending to not update software of the specified client, recommending to not update hardware of the specified client, recommending to not update an operating system of the specified client, or recommending to not update firmware of the specified client.

21. The method of claim 20, wherein the inferring the recommended configuration comprises:
using knowledge about one or more spikes in one or more of third party searches, network queries, or messages associated with at least one of one or more hardware issues or one or more software issues to infer the recommended configuration of the specified client.

* * * * *